(12) United States Patent
Jenkins et al.

(10) Patent No.: US 8,164,037 B2
(45) Date of Patent: Apr. 24, 2012

(54) CO-BORESIGHTED DUAL-MODE SAL/IR SEEKER INCLUDING A SAL SPREADER

(75) Inventors: David D. Jenkins, Tucson, AZ (US); Byron B. Taylor, Tucson, AZ (US); David J. Markason, Tucson, AZ (US)

(73) Assignee: Raytheon Company, Waltham, MA (US)

(*) Notice: Subject to any disclaimer, the term of this patent is extended or adjusted under 35 U.S.C. 154(b) by 353 days.

(21) Appl. No.: 12/567,740

(22) Filed: Sep. 26, 2009

(65) Prior Publication Data

US 2011/0073704 A1 Mar. 31, 2011

(51) Int. Cl.
- F41G 7/22 (2006.01)
- F42B 15/01 (2006.01)
- F42B 10/62 (2006.01)
- F41G 7/00 (2006.01)
- F42B 10/00 (2006.01)
- F42B 15/00 (2006.01)

(52) U.S. Cl. ...... 244/3.16; 244/3.1; 244/3.15; 244/3.21; 244/3.24; 250/200; 250/201.1; 250/203.1; 250/203.2; 250/203.3; 250/203.6; 356/3; 356/4.01

(58) Field of Classification Search ............ 244/3.1–3.3; 342/61, 62; 343/700 R, 772, 781 R, 781 CA; 356/4.01, 3; 250/200, 201.1, 203.1, 203.2; 250/203.3, 203.6

See application file for complete search history.

(56) References Cited

U.S. PATENT DOCUMENTS

| | | | |
|---|---|---|---|
| 3,636,248 A | 1/1972 | Korpel | |
| 3,971,939 A * | 7/1976 | Andressen | 244/3.16 |
| 5,214,438 A | 5/1993 | Brusgard | |
| 5,973,649 A | 10/1999 | Andressen | |
| 6,111,241 A * | 8/2000 | English et al. | 250/203.2 |
| 6,262,800 B1 * | 7/2001 | Minor | 244/3.16 |
| 6,268,822 B1 * | 7/2001 | Sanders et al. | 342/62 |
| 6,606,066 B1 * | 8/2003 | Fawcett et al. | 343/781 CA |
| 6,741,341 B2 * | 5/2004 | DeFlumere | 356/4.01 |
| 6,919,840 B2 * | 7/2005 | Friedrich et al. | 244/3.16 |
| 6,924,772 B2 * | 8/2005 | Kiernan et al. | 343/781 CA |
| 6,987,256 B2 * | 1/2006 | English et al. | 250/203.6 |
| 7,049,597 B2 | 5/2006 | Bodkin | |
| 7,183,966 B1 * | 2/2007 | Schramek et al. | 244/3.16 |
| 7,540,449 B2 * | 6/2009 | Jenkins et al. | 244/3.16 |
| 8,033,221 B2 * | 10/2011 | Edwards | 244/3.16 |
| 2005/0093757 A1 | 5/2005 | Kiernan et al. | |
| 2007/0290096 A1 | 12/2007 | Jenkins | |
| 2008/0087761 A1 * | 4/2008 | Jenkins et al. | 244/3.16 |
| 2008/0205818 A1 | 8/2008 | Kane et al. | |

FOREIGN PATENT DOCUMENTS

| | | |
|---|---|---|
| DE | 102007002336 A1 | 7/2008 |
| EP | 1770349 A1 | 4/2007 |

* cited by examiner

*Primary Examiner* — Bernarr Gregory
(74) *Attorney, Agent, or Firm* — Erica A. Gifford

(57) ABSTRACT

In a co-boresighted SAL/IR seeker, the optical system and particularly the secondary lens and position of the SAL detector are configured to produce a well-corrected spot of laser energy at the SAL detector. A spreader is positioned between the secondary mirror/lens and the SAL detector, possibly on the secondary mirror, away from the aperture stop and not in the optical path to the IR detector. The spreader is configured to spatially homogenize the laser energy to increase the size of the spot of focused laser energy at the SAL detector to set the system transfer function to meet slope requirements. Spatial homogenization serves to reduce both boresight shift and slope non-linearities. This approach greatly simplifies the time and labor intensive calibration of the SAL detector's system transfer function.

17 Claims, 13 Drawing Sheets

$$\Delta X = \frac{(A+D) - (B-C)}{A+B+C+D}$$

$$\Delta Y = \frac{(A+B) - (C+D)}{A+B+C+D}$$

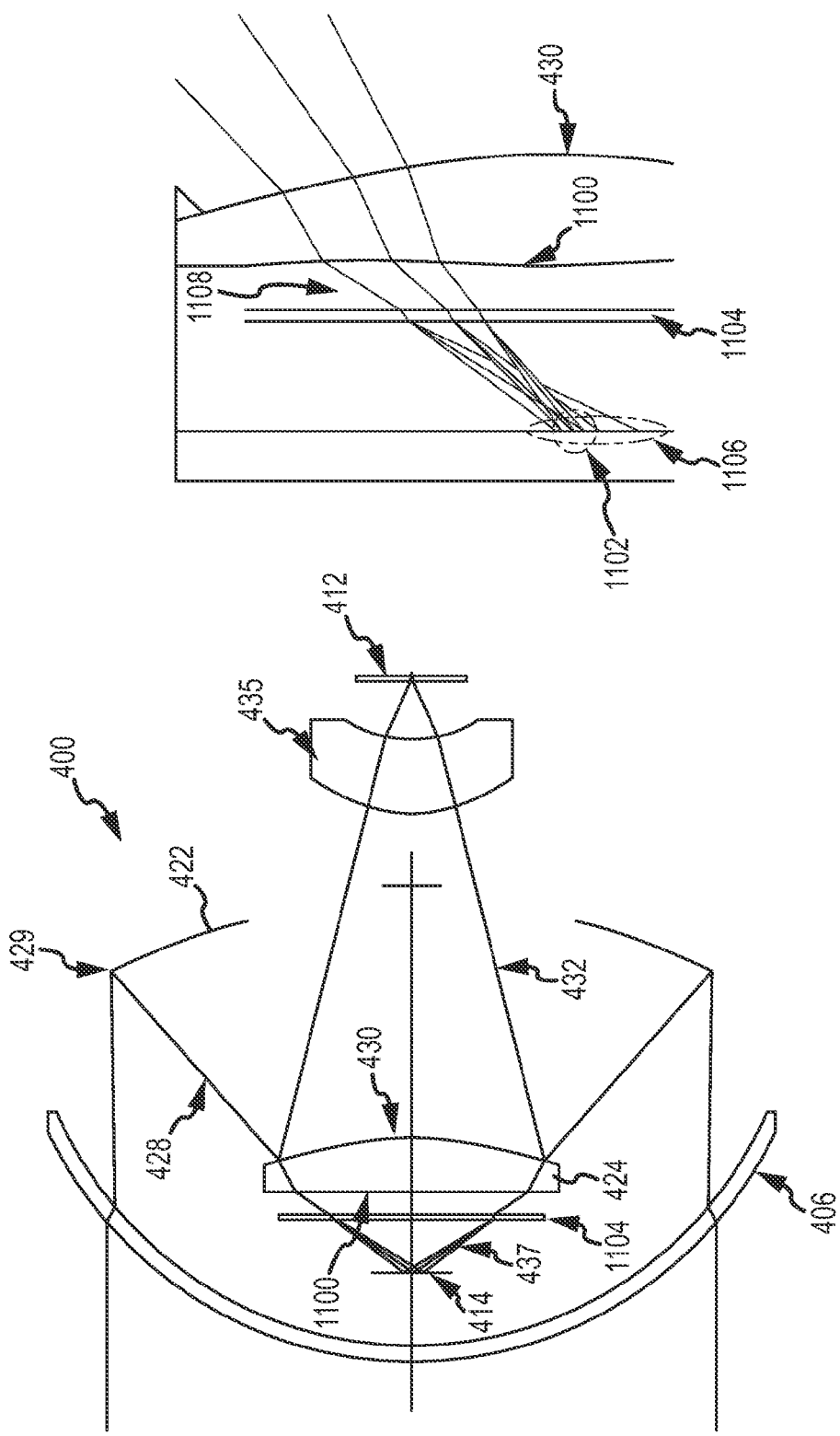

CO-BORESIGHTED DUAL-MODE SAL/IR SEEKER INCLUDING A SAL SPREADER

GOVERNMENT RIGHTS

This invention was made with United States Government support under Contract number W31P4Q-04-C-0059 with the Department of the Army. The United States Government has certain rights in this invention.

BACKGROUND OF THE INVENTION

1. Field of the Invention

This invention relates to co-boresighted dual-mode SAL/IR seekers for projectiles, missiles, and other ordnance that engage targets by detecting and following semi-active laser (SAL) energy scattered from the targets and detecting passive infrared (IR) emissions from the targets.

2. Description of the Related Art

Laser guided ordnance is commonly used to engage point targets with a high probability of success and minimal collateral damage. Such ordnance includes guided artillery projectiles, guided missiles, and guided bombs, all of which will be referred to herein as "projectiles".

A laser guided projectile typically includes a semi-active laser (SAL) seeker to detect laser radiation scattered from the intended target and to provide signals indicative of the target bearing such that the projectile can be guided to the target. The SAL may include a non-imaging optical system to capture and focus the scattered laser radiation and a position-sensitive detector e.g. a quad-detector. The optical system may convert the target bearing to an irradiance distribution or "spot" positioned on the detector. As the target bearing changes the position or spatial displacement of the spot changes. The detector produces at least one guidance signal in response to the position of the spot as a measure of target bearing.

U.S. Pat. No. 6,924,772 entitled "Tri-mode co-boresighted seeker" describes a tri-mode co-boresighted seeker including a primary collecting mirror assembly having a parabolic surface and a forwardly located dielectric secondary mirror assembly including a dielectric mirror coating which reflects infrared (IR) energy to an IR detector assembly located on a central longitudinal axis on one side of the secondary mirror while providing substantially unobstructed propagation of millimeter wave RF energy and laser energy in a joint or common signal path there through to means located on the other side of the secondary mirror for extracting and diverting laser energy away from the common RF-optical signal path to a laser sensor assembly while causing little or no disturbance to the RF signal as it propagates to a co-located bifurcated waveguide assembly which couples the RF energy to an RF sensor means located behind the primary mirror.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

In a co-boresighted SAL/IR seeker, a two-mirror telescope optical system provides a common aperture at the primary mirror for collecting and focusing both IR and laser energy onto a secondary mirror/lens that reflects the IR energy to an IR detector and transmits the laser energy to a positionally-sensitive SAL detector. Obscurations of the transmitted laser energy caused by the co-boresighted secondary mirror/lens and mounting structures, SAL detector dead zones and possibly vignetting on the dome ring over the gimbal field of regard produce a boresight shift and slope non-linearities in the SAL detector's system transfer function. The invention mitigates these errors to meet slope requirements by configuring the secondary lens on the forward side of the secondary mirror/lens and positioning the SAL detector to form a small spot of focused laser energy on the SAL detector. The secondary lens is a focusing element for laser energy. A spreader is positioned between the secondary mirror/lens and the SAL detector, possibly on the secondary mirror, away from the aperture stop and not in the optical path to the IR detector. The spreader is configured to spatially homogenize the laser energy to increase the size of the spot of focused laser energy on the SAL detector to set the system transfer function to meet the slope requirements. Spatial homogenization serves to reduce both boresight shift and slope non-linearities.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 11a and 11b are a diagram of a common aperture dual-mode SAL/Imaging seeker including a spreader positioned away from the common aperture stop in the SAL optical path and a close-up view of the spatial homogenization produced by the spreader;

DETAILED DESCRIPTION OF THE INVENTION

The present invention describes a co-boresighted SAL/IR seeker in which a two-mirror telescope optical system provides a common aperture at the primary mirror for collecting and focusing both IR and laser energy onto a secondary mirror/lens that reflects the IR energy to an IR detector and transmits the laser energy to a positionally-sensitive SAL detector. Obscurations of the transmitted laser energy caused by the co-boresighted secondary mirror/lens and mounting structures, SAL detector dead zones and possibly vignetting on the dome ring over the gimbal field of regard produce a boresight shift and slope non-linearities in the SAL detector's system transfer function. The invention mitigates these errors to meet system requirements by configuring the secondary lens on the forward side of the secondary mirror/lens and positioning the SAL detector to form a small spot of focused laser energy on the SAL detector. The secondary lens is a key focusing element for laser energy. A spreader is positioned between the secondary mirror and the SAL detector, possibly on the secondary mirror, away from the aperture stop and not in the optical path to the IR detector. The spreader is configured to spatially homogenize the laser energy to increase the size of the spot of focused laser energy on the SAL detector to set the system transfer function to meet slope requirements. Spatial homogenization serves to reduce both boresight shift and slope non-linearities. This approach greatly simplifies the time and labor intensive calibration of the system transfer function.

Figure 1:
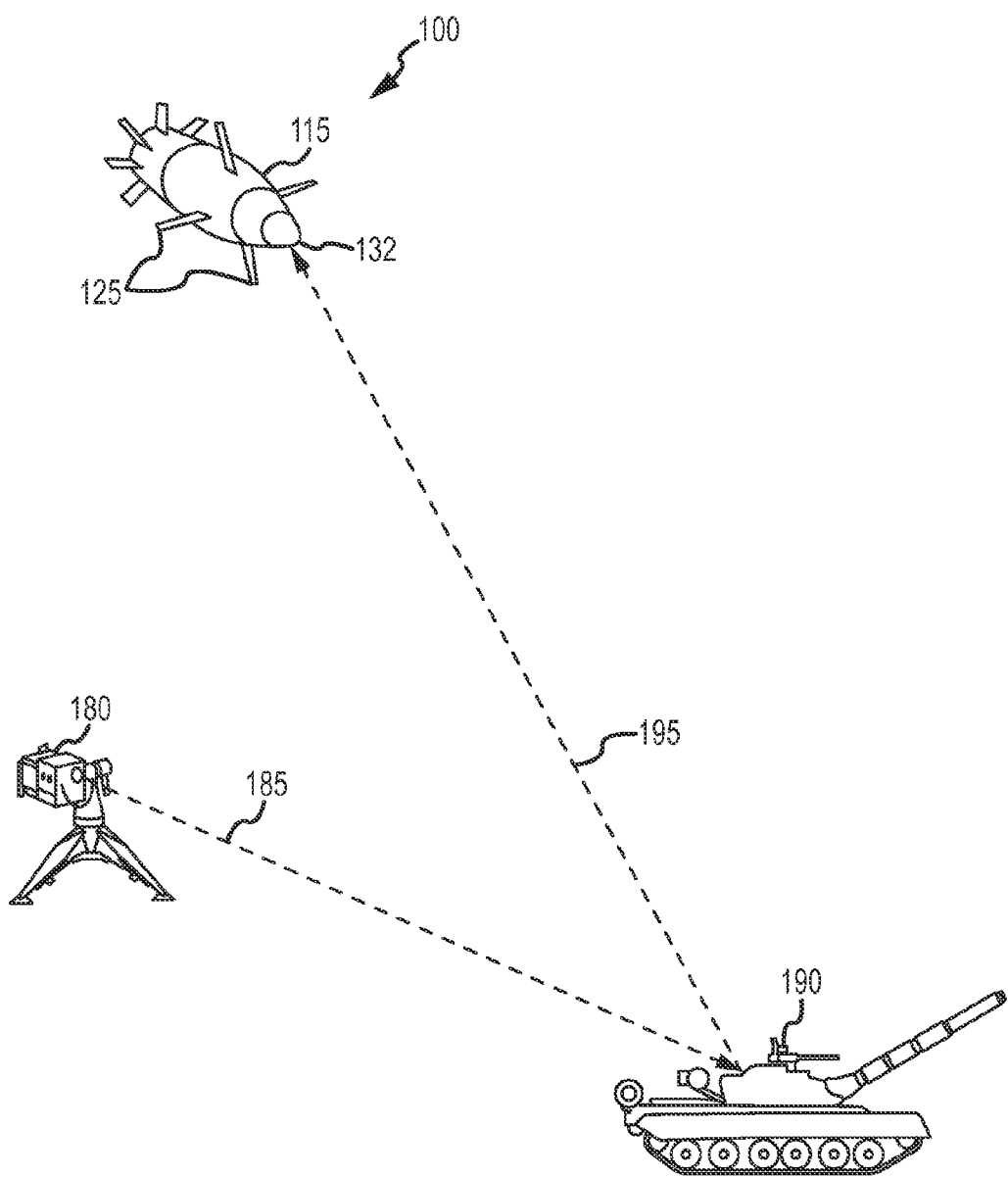
FIG. 1 is a schematic illustration of a laser guided projectile engaging a target.

Referring now to FIG. 1, a laser guided projectile 100 may engage a target 190 by detecting and following reflected laser radiation 195 from the target 190. In FIG. 1, the target 190 is represented as a tank, but may be another type of vehicle or a structure, building or other stationary object. The target 190 may be illuminated with laser energy 185 from a laser designator 180. The laser designator 180 may be located on the ground, as shown in FIG. 1, or may be located in a vehicle or aircraft. The reflected laser energy 195 may be a portion of the illumination laser energy 185.

The laser guided projectile 100 may include a projectile body 115, control surfaces 125, and a guidance system. The guidance system may include a seeker, of which only a transmissive dome 132 is visible in FIG. 1. The seeker may be "body fixed" or "gimbaled". The guidance system may include a flight control system to control the flight of the laser guided projectile 100 by manipulating one or more control surfaces 125 based on at least one guidance signal from the seeker. In the example of FIG. 1, the control surfaces 125 are shown as canards, but may be fins, wings, ailerons, elevators, spoilers, flaps, air brakes or other controllable devices capable of affecting the flight path of the laser guided projectile 100.

Figure 2:
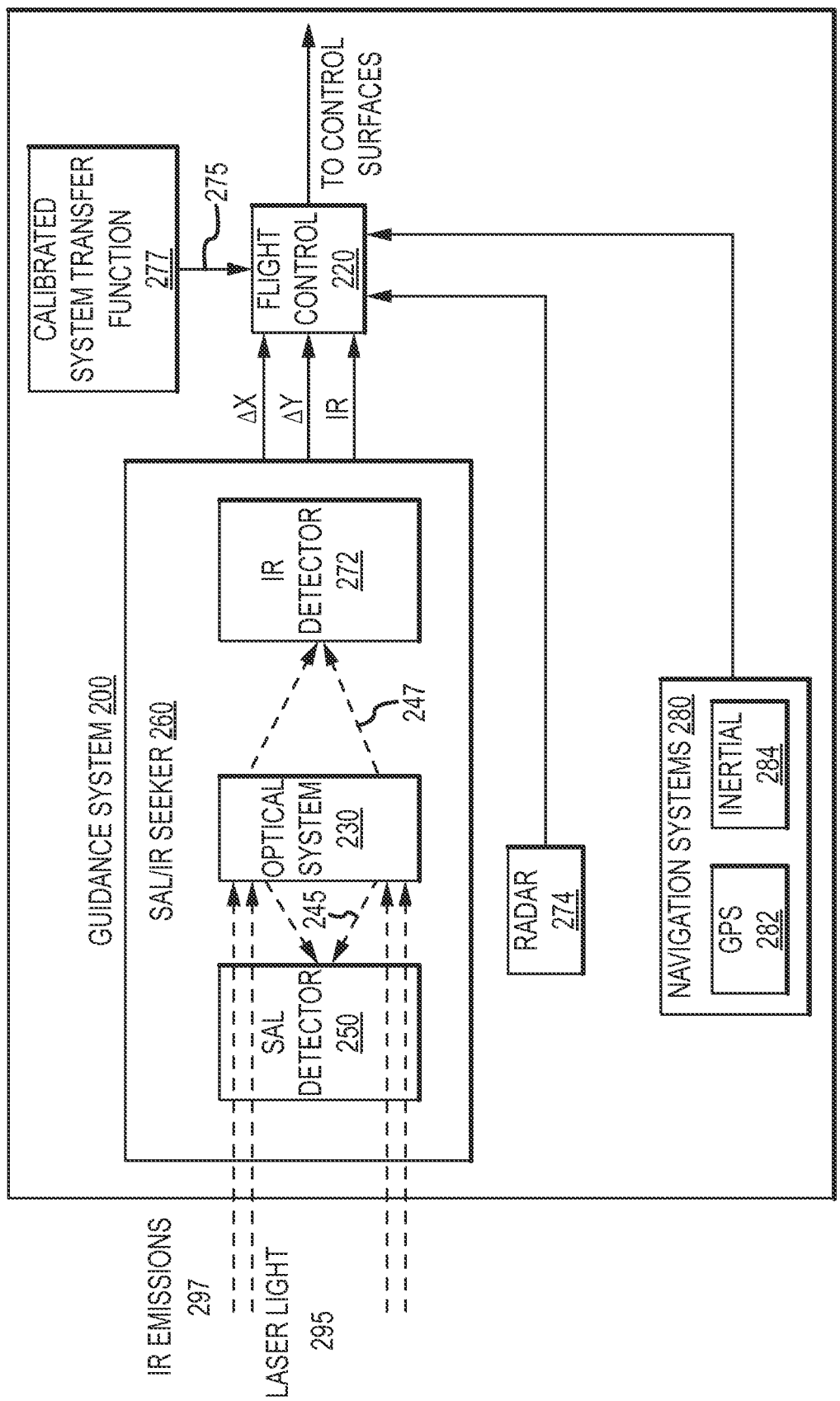
FIG. 2 is a block diagram of a guidance system including a SAL/IR seeker.

Referring now to FIG. 2, a guidance system 200, which may be suitable for use in the projectile 100, may include a dual-mode co-boresighted SAL/IR seeker 260 and a flight control system 220. The dual-mode SAL/IR seeker 260 may include a two-mirror optical system 230 having a common aperture to capture and focus laser light 295 (0.35 to less than 3 microns) reflected from a target to form a laser energy spot 245 on a positionally-sensitive SAL detector 250 and to capture and condense or focus passive IR emissions 297 (LWIR 8-12 microns or MWIR 3 to 5 microns) from the target to form a two-dimensional image 247 on an IR detector 272. In a given application, the wavelength of the laser light does not overlap with the sensed wavelengths of the passive IR emissions. Typical laser designators operate at approximately 1.06 microns. There is some interest in using an 'eye-safe' wavelength of 1.55 microns. The dual-mode seeker 260 may provide at least one SAL guidance signal indicative of an X, Y position or spatial displacement of the laser energy spot and/or at least one IR guidance signal derived from the IR images. The at least one SAL guidance signal may include signals $\Delta X$ and $\Delta Y$ which are indicative of the position of the laser energy spot 245 along two orthogonal axes. For example, a "designate mode" uses only the SAL guidance signal to target impact. An "anoint mode" uses the SAL guidance signal to acquire the target and then hands over to the IR guidance signal for terminal operations. An IR mode uses only passive imaging. The IR images may also be used to classify the target and refine targeting. IR detectors rely on the heat given off by the target for identification and tracking. This can be very effective but is subject to noise, clutter and countermeasures such as decoys.

Flight control system 220 may receive or look-up a correction 275 from a calibrated system transfer function 277 for signals $\Delta X$ and $\Delta Y$ in the "linear" region of the SAL detector's system transfer function. The calibrated system transfer function of SAL detector 250 may deviate from the ideal system transfer function due to obscurations of the optical system 230. These obscurations may cause a boresight shift, slope change and deviation from linearity of the ideal transfer function shown in FIG. 3b. These errors may require calibration to minimize boresight shift and meet slope requirements for the guidance system. Other sources of error such as an offset in the lateral position of the SAL detector may also be calibrated out.

The guidance system 200 may optionally include one or more additional seekers 270, such as a radar seeker 274. The guidance system 200 may optionally include one or more navigation systems 280, such as a global positioning system (GPS) 282 and/or an inertial navigation system 284.

The flight control system 220 may receive at least one guidance signal from the dual-mode seeker 260. The flight control system 220 may also receive guidance signals from the additional seekers 270 and navigations systems 280 when present. In response to the guidance signals, the flight control system 220 may control the flight of the projectile such that the projectile arrives at a designated target.

The flight control system 220 may include one or more processors that accept at least one guidance signal from the dual-mode seeker and generate control signals to control the flight or trajectory of a projectile such as the projectile 100. The flight control system 220 may include control actuators to convert the control signals into physical movements of control surfaces such as the canards 125 shown in FIG. 1.

Figure 3A:
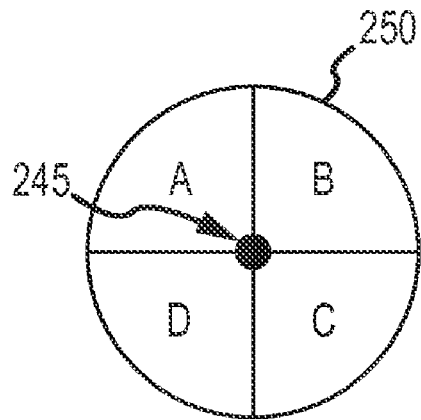
FIG. 3 is a diagram of a SAL detector and its ideal transfer function for a FOV about boresight.

FIG. 3a shows a frontal view of the detector 250 and the focused laser energy spot 245. The detector 250 may comprise four quadrants A, B, C, D. Each quadrant may produce a corresponding signal A, B, C, D in response to the laser energy incident upon each quadrant. Guidance signal $\Delta X$ may indicate an imbalance between the laser energy incident upon the left (quadrants A and B) and right (quadrants C and D) halves of the detector 250. Guidance signal $\Delta Y$ may indicate an imbalance between the laser energy incident upon the top (quadrants A and C) and bottom (quadrants B and D) halves of the detector 250. The terms "left", "right", "top", and "bottom" refer to the detector 250 as shown in FIG. 3a and do not imply any physical orientation of the detector 250 within a projectile such as the projectile 100. When the laser spot 245 is centered on the detector 250, the signals A, B, C, D may be essentially equal and the guidance signals ΔX and ΔY may both be zero or nearly zero. The detector 250 may be a single quadrant or monolithic design that is positionally sensitive.

Figure 3B:
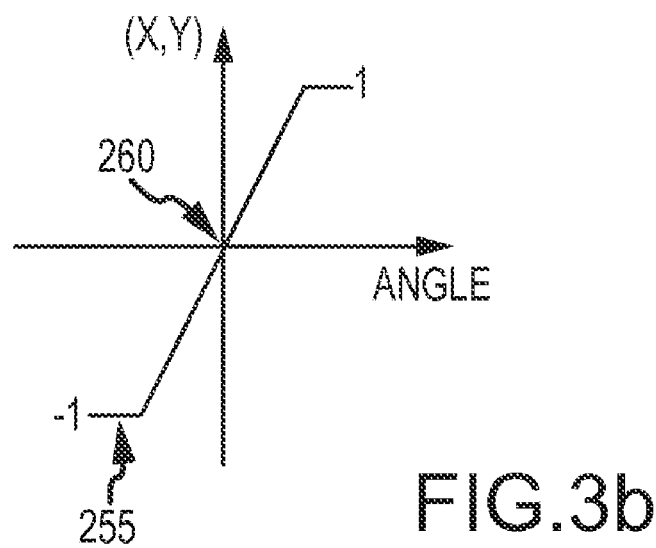

More particularly, the detector 250 may effectively measure the centroid of the incident laser energy on the detector 250. As shown in FIG. 3b, the transfer function 255 is a ratio of the energy on the different quadrants of the detector. When energy in spot 245 is hitting all four quadrants A-D, the guidance system operates in a "linear" region 260 of the transfer function 255. Given ΔX and ΔY, the transfer function 255 in the linear region 260 determines the angle of the guidance system from the target (e.g. target bearing). Ideally the linear region 260 has zero boresight shift, no variation in slope and is perfectly linear. When energy is hitting only two quadrants, the guidance system operates outside the linear region, where the transfer function nears +/−1 for ΔX or ΔY. The guidance system only knows the direction towards the target, but not its true angle. The size of the spot 245 may affect the performance of the guidance system. For example, a small spot tends to move off of overlapping multiple detector areas faster than a big spot. A larger spot improves the transfer function by making a relatively wide transfer function thereby covering larger angles off boresight. The width and slope of the transfer function will depend on the application. In general, the slope provides the sensitivity required to map changes in the spatial displacement of the spot on the detector to target bearing.

The position of SAL seeker 260 may be body-fixed within a projectile such as the projectile 100. For example, the SAL seeker 260 may be disposed within the projectile 100 such that an optical axis of the SAL seeker 260 is aligned with a longitudinal axis of the projectile 100. In this case, the laser spot 245 may be centered on the detector 250 when the longitudinal axis of the projectile 100 is pointed directly at the designated target. The SAL seeker 260 may be mounted on a two-axis gimbal (e.g. roll-nod or Az/El) within the projectile 100 such that the optical axis of the SAL seeker 260 may be rotated around and off of the longitudinal axis of the projectile 100. The IR detector may be body-fixed off gimbal and a "Coude" path of free-space optics provided between the fixed IR detector and gimbaled optical system. If gimbaled, the laser spot 245 may be centered on the detector 250 when the optical axis of the dual-mode seeker 260 is pointed directly at the designated target. The target bearing is the sum of the pointing angle of the seeker plus the angle off boresight sensed by the detector.

Figure 4:
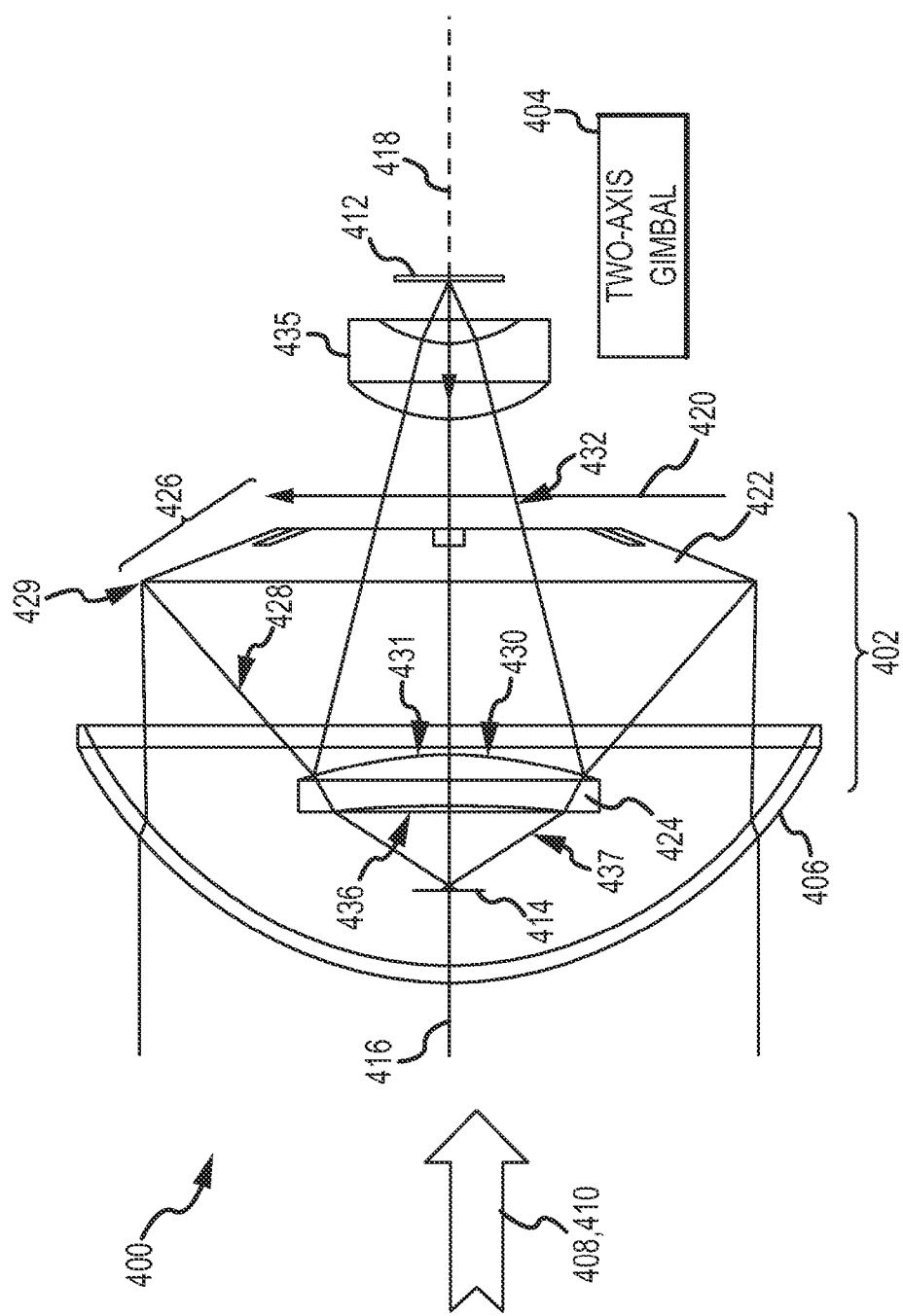
FIG. 4 is a diagram of a common aperture dual-mode SAL/IR seeker.

Referring now to FIG. 4, an exemplary co-boresighted SAL/IR seeker 400 may include a two-mirror optical system 402 mounted on a two-axis gimbal 404 behind a dome 406 that permits propagation of both laser energy 408 (0.35 to 3 microns) and IR energy 410 (LWIR at 8-12 microns or MWIR at 3-5 microns) there through. Optical system 402 separates the IR energy and laser energy and directs the IR energy to an IR detector 412 and the laser energy to a SAL detector 414. A central longitudinal axis 416 may extend the length of the projectile through the center of the dome. When centered, the optical system boresight lies along the longitudinal axis. The gimbal may move the optical system about a first axis 418 and around a second axis 420 to slew the seeker boresight over the field of regard (FOR). The gimbal, for example, may be Roll-Nod or Az/El. The two-axis gimbal 404 may be centered at a point between field lens 435 and primary mirror 422. The seeker may operate in anoint, designate or IR modes.

Two-mirror optical system 402 may include a primary mirror 422 and a secondary mirror/lens 424 centered on the boresight axis. The primary mirror defines a common aperture 426 for collecting and focusing laser energy and IR energy along a common optical path 428. The primary mirror may comprise an annular mirror having an outer diameter of at least 3 inches and typically 5 inches or greater. The relatively large common aperture makes the optical system insensitive to atmospheric scintillation. The primary mirror is typically aspheric and may comprise a diffractive element for providing color correction. The primary mirror defines the "aperture stop" 429 where all ray bundles come together.

Secondary mirror/lens 424 between the dome and primary mirror in the common optical path creates a central obscuration of the common aperture. The secondary mirror/lens has an aft side facing the primary mirror and a forward side facing the dome. The aft side is a secondary mirror 430 configured to reflect IR energy along a first optical path 432 through a field lens 435 to IR detector 412. The secondary mirror 430 also permits propagation of laser energy there through, through a secondary lens 436 on the forward side that shapes the laser energy along a second optical path 437 to the SAL detector 414.

Secondary mirror 430 may comprise a multi-layer IR coating 431 formed on a convex aspheric surface to reflect IR. Secondary mirror 430 may also comprise a long wave pass coating behind the IR coating 431 to prevent a substantial portion of incident light at wavelengths other than the specific SAL wavelength or wavelength band of interest from reaching the SAL detector. For example, considering a laser wavelength of 1.06 microns used in conjunction with a silicon-based detector, the coating rejects energy at wavelengths less than approximately 1 micron (e.g. visible light). The response of the silicon detector rolls-off rapidly above approximately 1.1 microns thus providing the desired high pass filtering. Mirror 430 may be aspheric.

In a dual-mode SAL/IR seeker, the IR detector is an imaging detector whereas the SAL detector is not an imaging detector. Consequently, the design of the optical system to form well corrected two-dimensional images at the IR detector is more exacting than the SAL design. Therefore, each of the optical surfaces in the common path (e.g. the dome, primary mirror and secondary mirror) and in the IR path (e.g. the field lens) is used to satisfy the imaging requirements of the IR detector. The remaining degrees of freedom, namely the position of the SAL detector and the secondary lens are used to meet the SAL slope requirements. More specifically, the position of SAL detector 414 and secondary lens 436 are used to form a highly aberrated spot that has the correct SAL slope. The spot may include hundreds of waves of spherical aberration such that the spot has a tight central core with a large halo around it. The central core provides the slope and the halo provides the required field of view.

Figure 5:
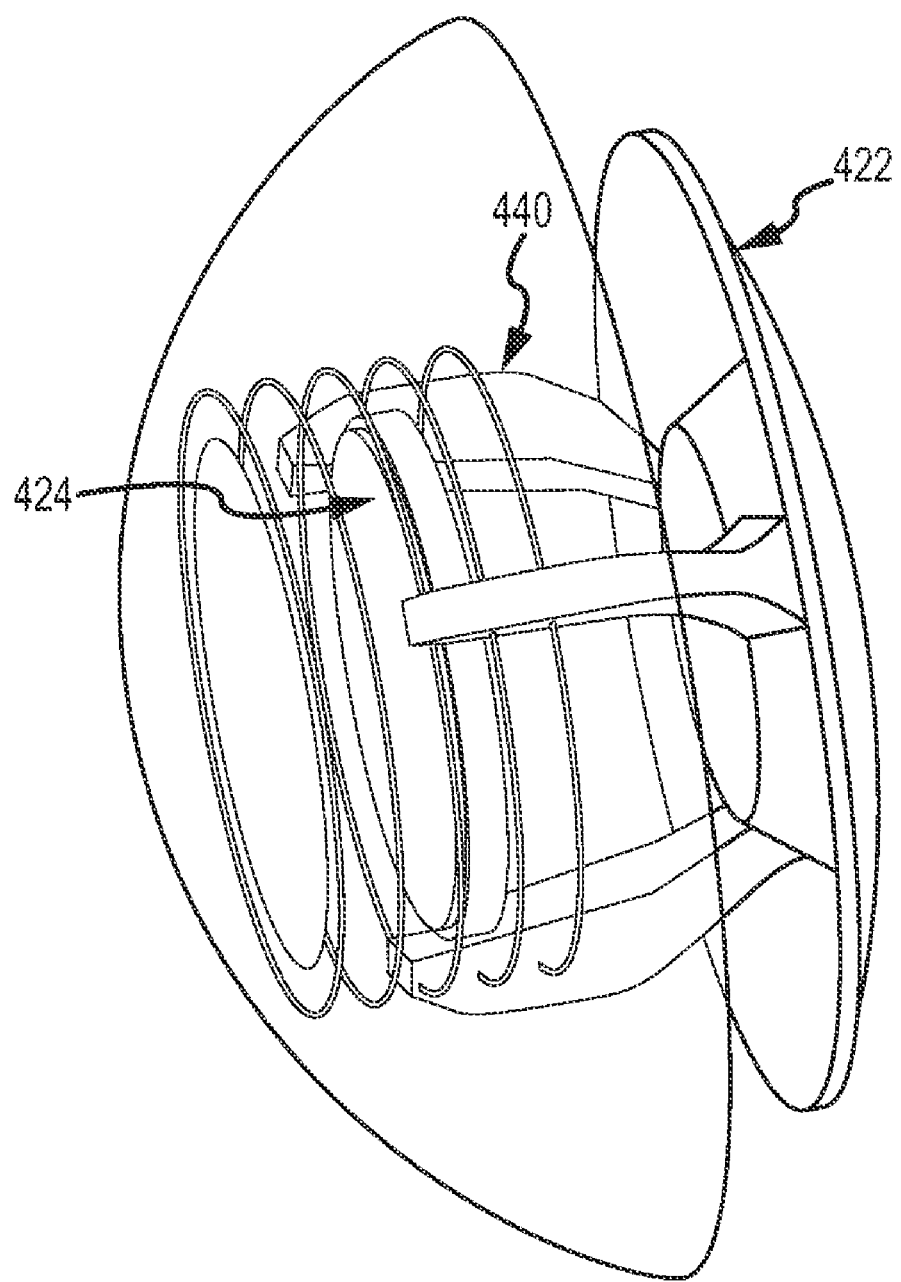
FIG. 5 is a diagram of mounting struts for positioning the secondary mirror in a two-mirror telescope.
Figure 6B:
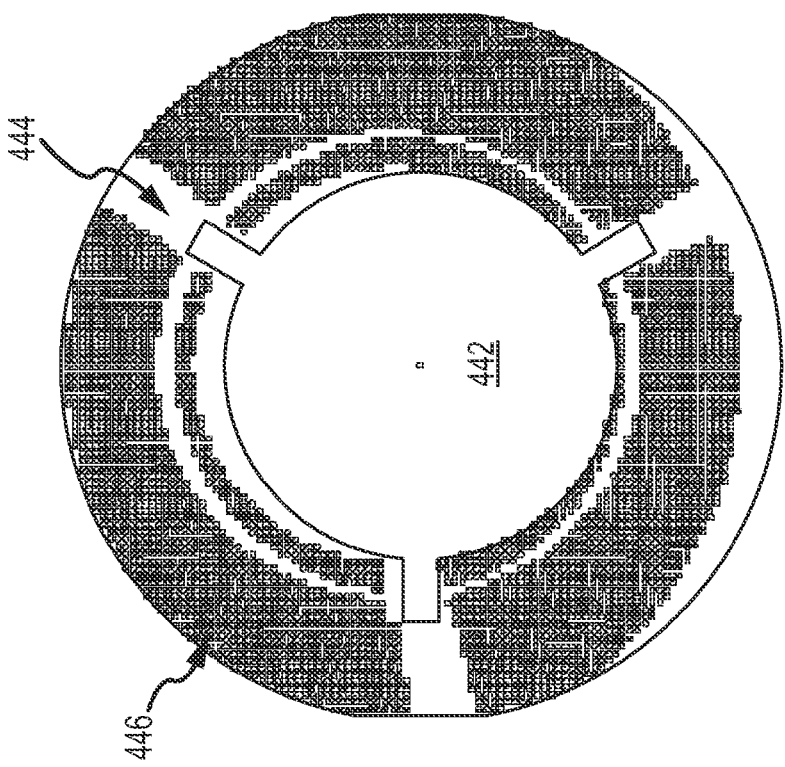
FIGS. 6a and 6b illustrate the on-axis and off-axis obscurations caused by the mounting struts and the secondary mirror/lens.
Figure 6A:
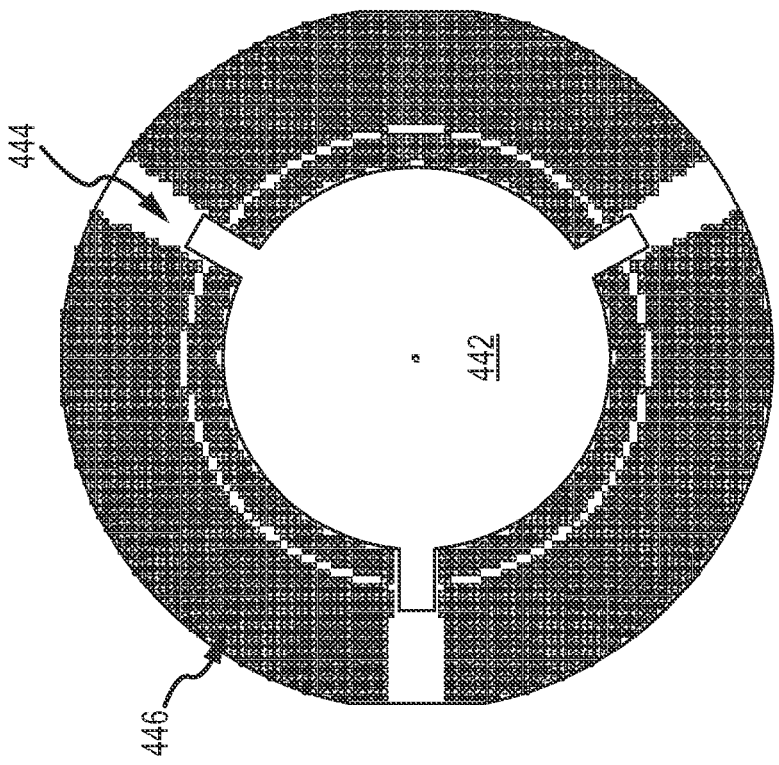

Referring now to FIGS. 5 through 6, the secondary mirror/lens 424 and mounting struts 440 that position the secondary mirror/lens 424 with respect to the primary mirror 422 obscure the common aperture. The secondary mirror/lens 424 creates a central obscuration 442 that prevents laser and IR energy transmitted through the dome 406 from reaching the primary mirror. The struts 440 create a radial obscuration 444 that prevents laser and IR energy that is reflected off the primary mirror from reaching the secondary mirror/lens. The patterns of light 446 and 448 scattered off the target at the SAL detector plane are different depending on whether the target is on-axis (FIG. 6a) or off-axis (FIG. 6b). Furthermore, the off-axis pattern 448 varies across the FOV.

Figure 7B:
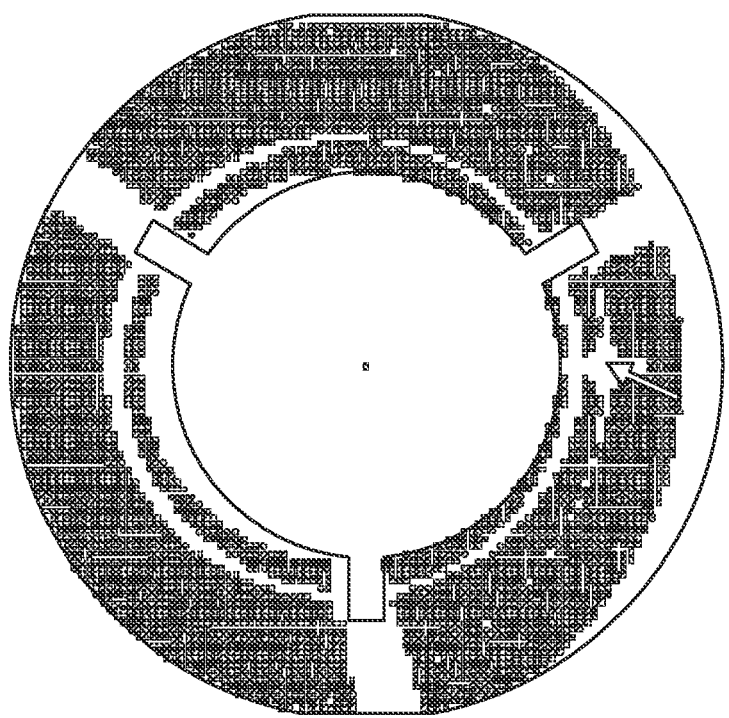
FIGS. 7a and 7b illustrate the on-axis and off-axis obscurations caused by the dead zones in the SAL quad-detector.
Figure 7A:
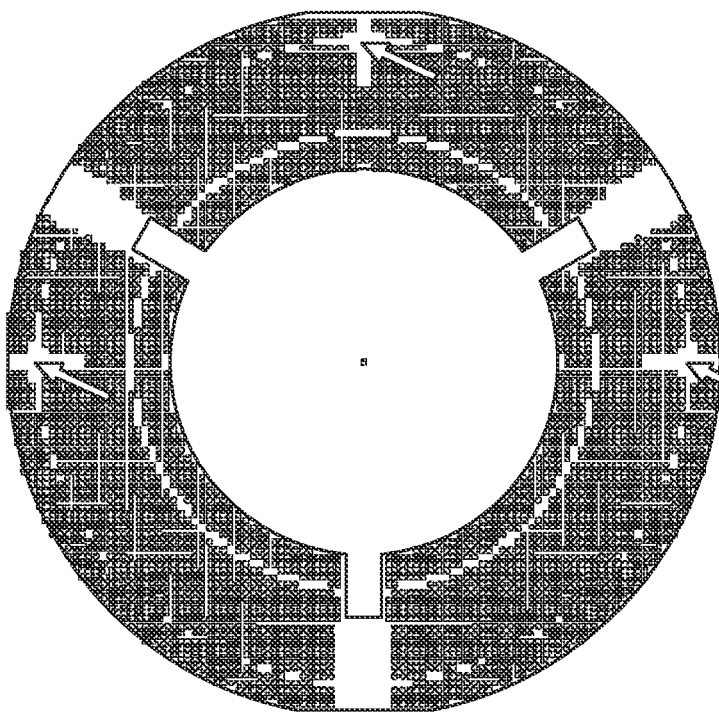

Referring now to FIGS. 7a and 7b, the SAL detector exhibits "dead zones" between the four quadrants and most importantly on boresight. The SAL spot is highly peaked in the center with a halo of much lower intensity light surrounding the peak. As shown in FIG. 7a, the peak gets effectively lost in the dead zone 450 at boresight. As shown in FIG. 7b, as the target moves off of boresight the slope will be slightly non-linear due to the peak emerging from the dead zone.

These asymmetries between on-axis and off-axis target bearings corrupt the SAL detector's system transfer function. The formation of the highly aberrated spot does not address this problem. Consequently, the boresight shift and slope non-linearities within the FOV may not meet system requirements.

Figure 8:
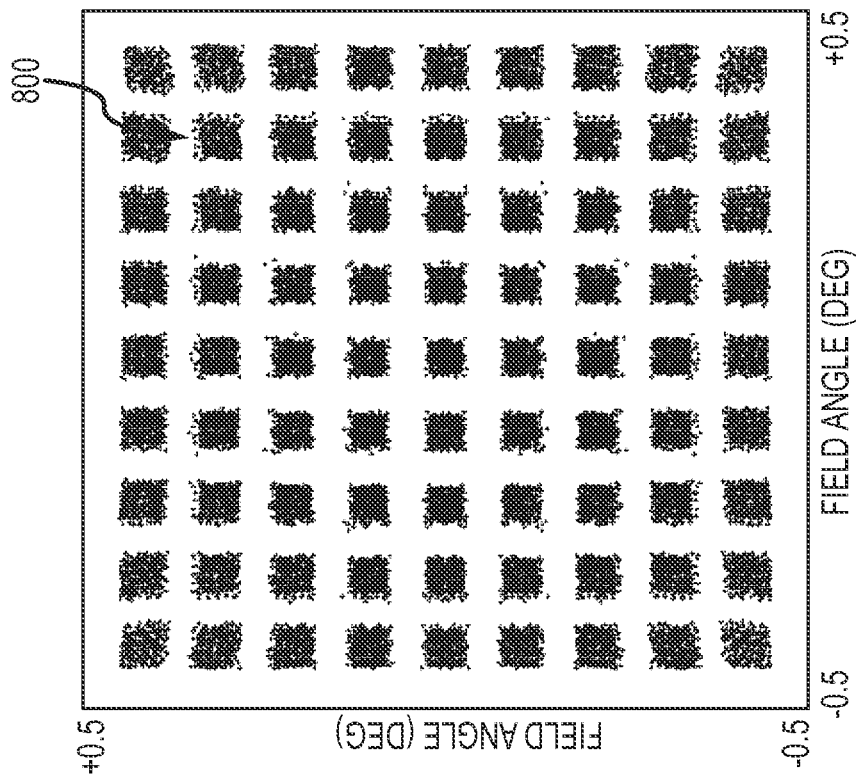
FIG. 8 is a diagram illustrating the collection of data from a target moved over the detector's FOV to store a unique offset for the on-axis position and each off-axis $\Delta X$ and $\Delta Y$ position.
Figure 9:
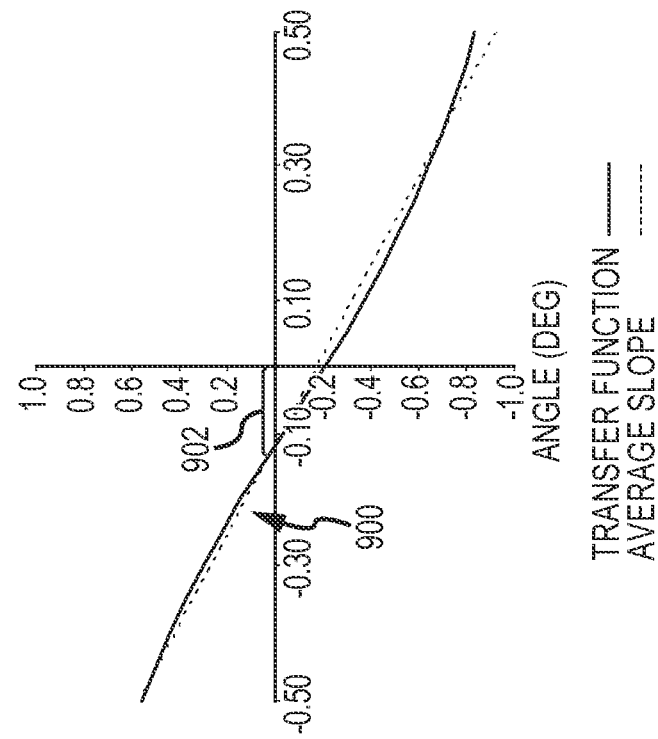
FIG. 9 is a system transfer function generated from the collected data illustrating the variance in offset, slope and non-linearity of the transfer function.

Referring now to FIGS. 8 and 9, these errors may be compensated for by calibrating the SAL detector and storing a unique offset from the ideal transfer function for each ΔX, ΔY pair over the FOV. The guidance system may store a table of corrections indexed by ΔX, ΔY. During flight the guidance system would look up and then apply the appropriate correction. Interpolation may be used. Calibration is a time and labor intensive process that requires indexing the target over a square grid 800 of angular positions e.g. 50×50 and collecting data at each grid position. As shown in FIG. 9 the actual transfer function 900 may have a boresight shift 902 of approximately −0.10 degrees, which means that a target that actually lies on boresight appears to lie −0.10 degrees off boresight. The transfer function may also exhibit considerable non-linearity over the FOV. Application of the unique corrections may bring a system transfer function that otherwise does not meet specified requirements into conformance.

Figure 10B:
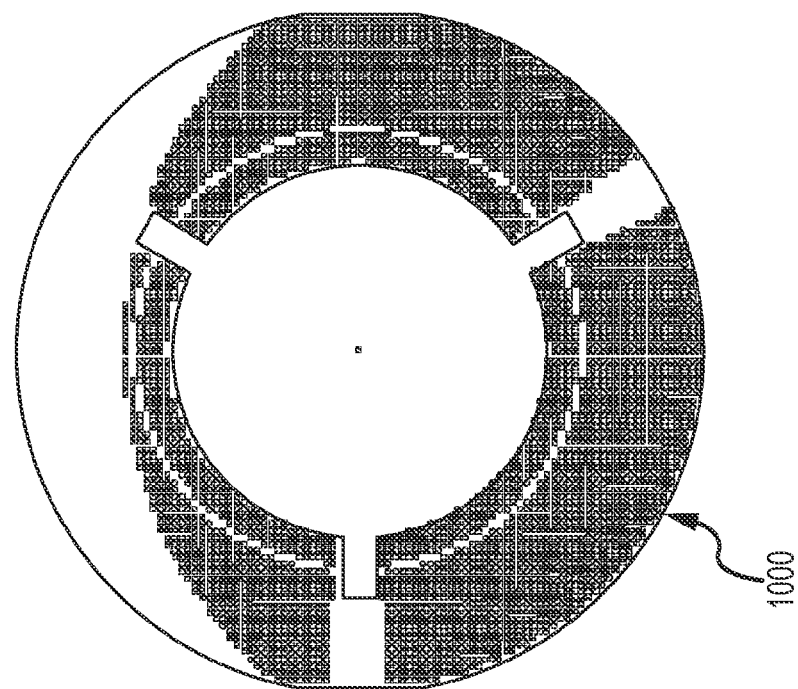
FIGS. 10a and 10b are diagrams illustrating vignetting on the dome ring and the asymmetric obscuration caused by large movements of the gimbal.
Figure 10A:
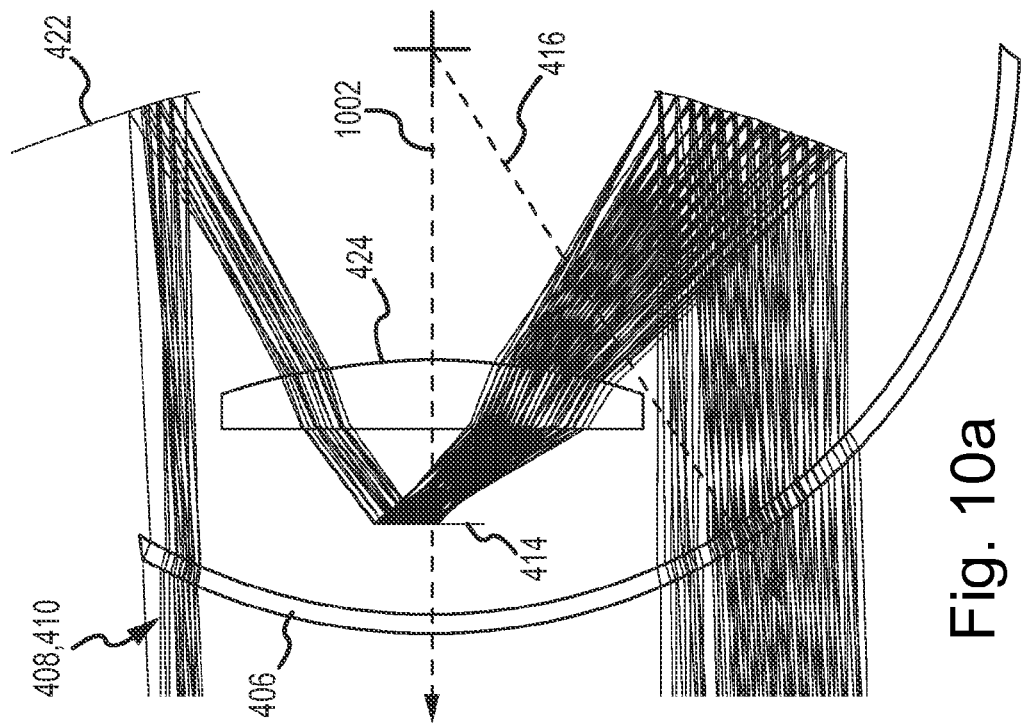

Referring now to FIGS. 10a and 10b, in some applications the gimbal may slew the seeker far enough that the edge of the dome 406 cuts off laser and IR energy 408, 410 from reaching the primary mirror 422. The light pattern 1000 incident onto the common aperture is asymmetric. This problem is known as "vignetting". Consequently the laser energy passed through the secondary mirror/lens 424 and focused onto the SAL detector 414 is asymmetrically obscured. This in turn affects the boresight shift and non-linearity of the transfer function as a function of the angle of boresight 1002 off the central longitudinal axis 416. This may require the entire labor intensive ΔX, ΔY calibration procedure to be repeated for different boresights. Assuming that the effect is symmetrical around the axis and assuming uniformity until the angle reaches some threshold where vignetting starts, the procedure would have to be repeated over a radial grid from the threshold angle to the maximum angle. The guidance system would store a three-dimensional table of corrections indexed by angle and ΔX, ΔY. During flight the guidance system would look up and then apply the appropriate correction. If these assumptions are not valid, the procedure may need to be repeated over the entire two-axis space.

Storing correction factors in a look-up table in memory, retrieving the correction and applying the correction to the guidance signals is not the problem. Other correction factors may have to be applied as well. The issue is the time and labor intensive process required to calibrate the transfer function over the field of view and possibly over the field or regard as well. This adds considerable cost to the seeker and must be performed for each seeker.

Referring now to FIGS. 11a-11b, the calibration procedure may be greatly simplified and possibly eliminated by modifying the seeker 400 depicted in FIG. 4. First, the secondary lens 1100 on the forward side of secondary mirror/lens 424 is configured and SAL detector 414 positioned to form a small spot 1102 of focused laser energy on the SAL detector. The secondary lens may be concave and may be aspheric. As described above, the entire optical system including the dome 406, primary mirror 422, secondary mirror 430 and secondary lens 1100 plus the position of the SAL detector form the small spot 1102 but the secondary lens and detector position are the only available degrees of freedom to reconfigure the optical system to produce the well-corrected spot. Therefore instead of forming a highly aberrated spot, the optical system forms a well corrected small spot 1102 on the SAL detector 414. The secondary lens is a key focusing element for laser energy. This small spot would produce a very high slope well outside the slope requirements of the system over a very narrow FOV. A spreader 1104 is positioned in the SAL optical path 437 and configured to spatially homogenize the laser energy to increase the size of the spot 1106 of focused laser energy on the SAL detector to set the system transfer function. The size of the spot sets the nominal slope. The diameter of spot 1106 may be five to ten times the diameter of spot 1102 (if the spreader was not included). The smaller well-corrected spot is not actually formed because of the presence of the spreader but it is important that the optics is designed in that manner.

Because the spreader homogenizes the energy the spot is far more uniform over the FOV and the FOR. This in turn minimizes the boresight shift and any non-linearities in the slope caused by the various obstructions and asymmetries. Ideally, the position of the spreader between the secondary lens and the SAL detector can be varied to change the transfer function to meet the slope requirements. As a result, the system transfer function may meet the system slope requirements with no or minimal calibration (e.g. boresight only).

Ideally, one would want to place the spreader 1004 at the aperture stop 429 at primary mirror 422 where all ray bundles come together. This would provide for optimal homogenization of the laser energy. However, the spreader cannot be placed in the optical path to the IR detector; doing so would degrade the two-dimensional images formed at the IR detector plane. Consequently, the spreader cannot be placed at the aperture stop. The spreader is placed between the secondary minor/lens 424 and SAL detector 414 away from the common aperture stop 429 and outside the common optical path 428 and IR optical path 432 to the IR detector 412. The spreader may be formed on the forward facing side of the secondary mirror/lens 424 with lens element 1100. All of the focusing or "condenser" optical elements e.g. dome 406, primary mirror 422, secondary mirror 430 and secondary lens 1100 lie before the spreader 1104 in the optical path. As best shown in FIG. 11b, the spreader 1104 may be positioned close enough to the aperture stop and far enough away from the SAL detector 414 to mix the laser energy ray bundles 1108 to form spot 1106. As shown, the spot 1106 is considerably larger than what the spot would be absent the spreader, perhaps at least 5× to 10× greater in diameter.

The spreader 1104 may comprise any suitable system for spatially homogenizing or otherwise scattering incident laser energy received by the detector. For example, the spreader may comprise a diffuser, a lenslet array, a "wavy" surface, a diffractive optical element, or other optical spreading element. In various embodiments, the spreader spatially homogenizes the incident laser energy by transmitting the laser energy through an input aperture comprising a diffuser or multiple relatively small lenses ("lenslets") to scatter the laser energy. The angular spread of the spreader affects the linear region of the transfer function. Thus, the spreader may be configured to deliver a selected width of the linear region of the transfer function and desired signal collection angles. Specifically, the position of the spreader along the optical path between secondary mirror/lens and the SAL detector may be varied to adjust the slope of the transfer function.

In an embodiment, the spreader may comprise a diffuser that diffuses incident laser energy to spatially homogenize the laser energy received by the detector. The diffuser may be selected and/or configured according to any appropriate criteria. For example, the diffuser may comprise a light shaping diffuser from Physical Optics Corporation, which may produce Gaussian spread profiles and high throughput.

In an embodiment, the spreader may comprise a lenslet array that subdivides the optical system's input aperture into distinct subregions, where each subregion illuminates a relatively large spot centered on the detector. The lenslet array forms the subregions using an array of small lenses or "lenslets". The lenslets scatter incident energy passing through the array. Each lenslet in the array may produce a fixed angular spread. In addition, the array may subdivide the aperture in two directions. For example, one side of the array may spread the energy vertically, while the other side spreads the energy horizontally. The transfer function or each sub-region may be substantially identical to the full transfer function of the array. The spread of each sub-region sets the system transfer function e.g., a +/−13 degree cone (about f/2 lenslet) produces a transfer function with a +/−13 degree linear region.

The array of lenslets may comprise a structure having a substantially homogeneous index of refraction and varying thicknesses for forming the lenslets. The extent to which the lenslets transmit homogenized energy corresponds to the number and configuration of the lenslets. Alternatively, the array may comprise a structure having a heterogeneous index of refraction and a substantially constant thickness, producing the same effect as a plurality of lenslets. Further, the array may comprise a material having a substantially heterogeneous index of refraction and varying thicknesses. The varying indices of refraction and the varying thicknesses both provide spatial homogenizing of incident energy.

Figure 12:
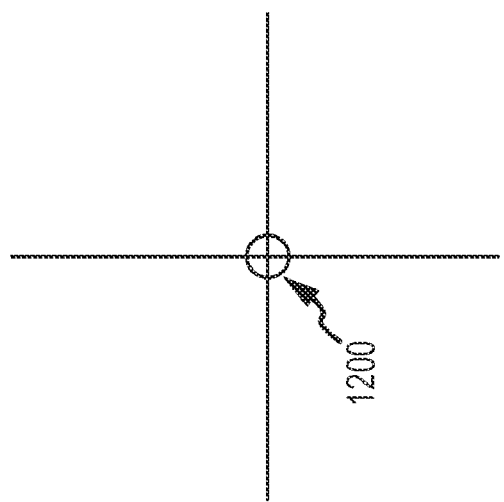
FIG. 12 is a diagram illustrating the collection of data from a target located on boresight to store a common offset for the entire FOV.

Referring now to FIG. 12, the calibration procedure may be simplified to a single boresight measurement 1200 to account for other sources of boresight shift such as misalignment of the SAL detector or eliminated completely. The former assumes that the system transfer function has the same boresight shill and slope on and off boresight or, more precisely, a variation in boresight shift and slope that meet system requirements. The later further assumes that the shift is zero or, more precisely, within system requirements and the slope meets requirements without any correction. In the former case, the flight control system is provided with a single correction value regardless of the seeker line-of-sight in the field of regard or the target position in the field of view. In the later case, no correction is provided.

Figure 13:
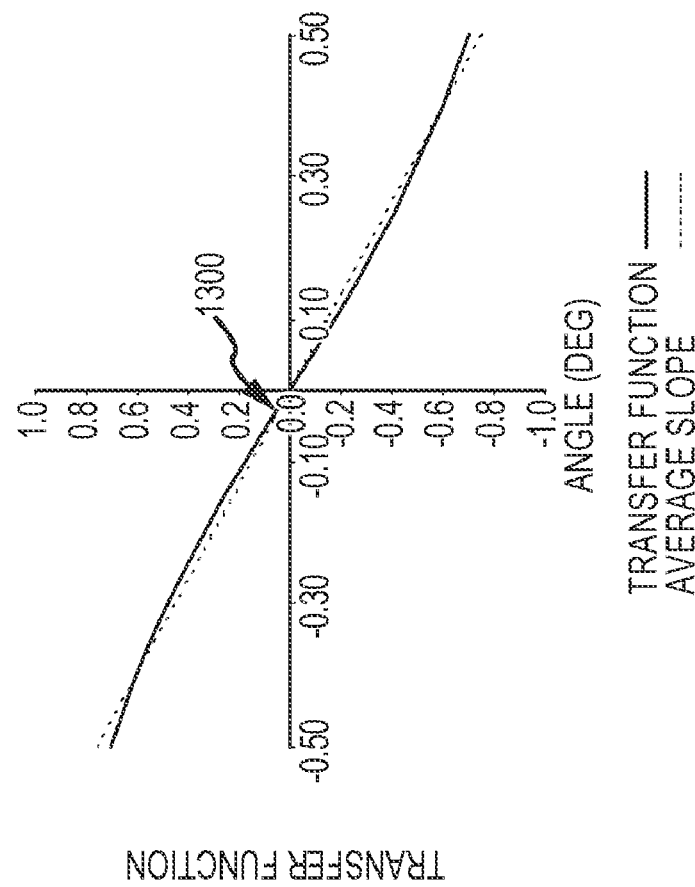
FIG. 13 is a system transfer function generated with the spreader over the FOV illustrating the improved offset, slope and linearity produced by the inclusion of the spreader.

Referring now to FIG. 13, a full multipoint calibration procedure over the FOV of the SAL detector using the spreader was performed to generate a system transfer function 1300. As shown the boresight shift has been substantially eliminated. The linearity of the transfer function is also improved. Elimination of the boresight shift and improvement in linearity allows the guidance system to operate with the simplified calibration procedure and still meet transfer function requirements.

Figure 14:
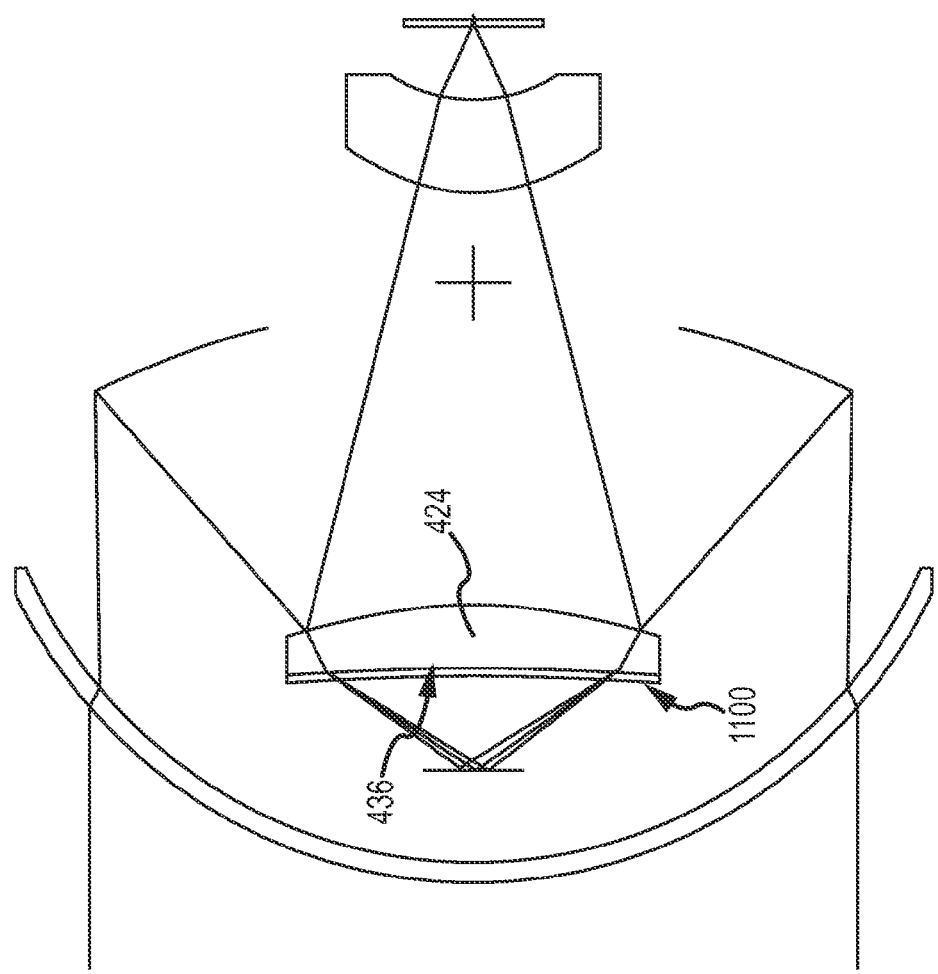
FIG. 14 is a diagram common aperture dual-mode SAL/Imaging seeker including a spreader integrated on the backside of the secondary optical element.

Referring now to FIG. 14, the spreader 1104 may be incorporated into the lens element 1100 on the forward side of secondary mirror 424. The possible advantages of this configuration are lower cost and smaller part count. Because the position of the spreader 1104 is now fixed, the position of SAL detector 414 is varied to meet the slope requirements.

Figure 15:
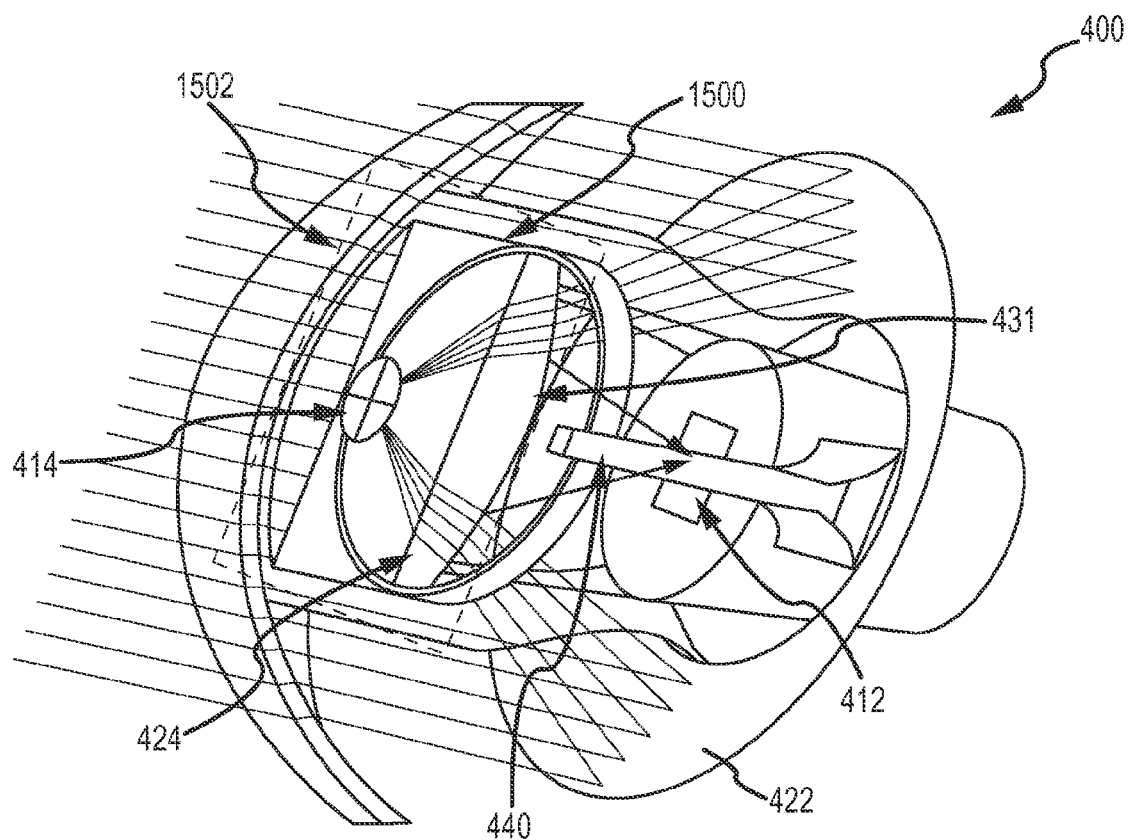
FIG. 15 is a common aperture dual-mode SAL/Imaging seeker including a housing and an EMI coating on the aft side of the secondary optical element that form a Faraday cage around the SAL detector.

Referring now to FIG. 15, seeker 400 may include a conductive housing 1500 for supporting the primary and secondary mirrors 422 and 424, SAL detector 414 and IR detector 412. The housing may include mounting struts 440 that position secondary mirror 424 with respect to primary mirror 422. In some applications, it may be desirable to form a Faraday cage 1502 around SAL detector 414. The Faraday cage permits laser energy to enter through the secondary mirror/lens but blocks out electromagnetic interference. This reduces noise in the SAL detector. To form the Faraday cage 1502, the housing is constructed from or coated with an electrically conductive material. IR reflective coating 431 on the aft side of secondary minor/lens 424 is an electromagnetic interference (EMI) coating. The coating 431 is in electrical contact with the conductive housing around its periphery to form the Faraday cage.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:
1. A dual-mode SAL/IR seeker, comprising:
an IR detector configured to detect two-dimensional images of focused incident IR energy to generate at least one IR guidance signal;
a positionally-sensitive SAL detector having a system transfer function that converts the spatial displacement of a spot of focused laser energy to a target bearing to generate at least one SAL guidance signal;
a primary mirror having a common aperture for collecting and focusing laser energy and IR energy along a common optical path;
a secondary mirror/lens in the common optical path that creates a central obscuration of the common aperture, said secondary mirror/lens having an aft side facing the primary mirror and a forward side, wherein the aft side is a secondary mirror configured to permit propagation of laser energy there through to the forward side along a first optical path to the SAL detector and to reflect IR energy along a second optical path to the IR detector, said primary and secondary mirrors configured to focus the IR energy to form the two-dimensional images at the detector,
wherein the forward side of the secondary mirror/lens is a lens element, said lens element configured and said SAL detector positioned to form a spot of focused laser energy on the SAL detector; and
a spreader positioned in the first optical path between the secondary mirror and the SAL detector away from the aperture stop at the primary mirror and not in the second optical path between the secondary mirror and the IR detector, said spreader configured to spatially homogenize the laser energy to increase the size of the spot of focused laser energy on the SAL detector to set the system transfer function.

2. The dual-mode SAL/IR seeker of claim 1, wherein the primary mirror has an outer diameter of at least 3 inches.

3. The dual-mode SAL/IR seeker of claim 1, further comprising a mounting structure that supports the secondary mirror/lens off of the primary mirror, said mounting structuring obscuring the transmission of laser energy from the common aperture to the SAL detector.

4. The dual-mode SAL/IR seeker of claim 1, further comprising:
a dome that is transmissive of laser energy and IR energy; and
a two-axis gimbal that slews an optical system comprising at least the primary mirror, secondary mirror/lens, SAL detector and spreader about a longitudinal axis through the center of the dome, said gimbal slewing the optical system to an extent that the common aperture experiences vignetting at the edges of the dome obscuring the transmission of laser energy to the SAL detector.

5. The dual-mode SAL/IR seeker of claim 1, where the secondary mirror is formed on a convex surface of the aft side and the lens element is formed on a concave surface on the forward side.

6. The dual-mode SAL/IR seeker of claim 1, wherein the secondary mirror comprises an electromagnetic interference (EMI) coating configured to pass laser energy and reflect IR energy.

7. The dual-mode SAL/IR seeker of claim 6, further comprising a conductive housing around and forward of the SAL detector, said conductive housing and said EMI coating aft of the SAL detector forming a Faraday cage around the SAL detector.

8. The dual-mode SAL/IR seeker of claim 1, wherein the spreader is on the forward side of the secondary mirror/lens.

9. The dual-mode SAL/IR seeker of claim 1, wherein the spreader is a diffuser.

10. The dual-mode SAL/IR seeker of claim 1, wherein the spreader is a lenslet array.

11. The dual-mode SAL/IR seeker of claim 1, wherein no optical focusing element is positioned between the spreader and the SAL detector.

12. The dual-mode SAL/IR seeker of claim 1, further comprising:
a flight control system that receives the at least one SAL guidance signal and applies a single calibration offset for all X, Y positions to said guidance signal to generate control signals to control the flight of the airborne platform.

13. The dual-mode SAL/IR seeker of claim 1, wherein the primary mirror comprises a diffractive element.

14. The dual-mode SAL/IR seeker of claim 1, wherein said spreader increases the diameter of the spot by at least a factor of five.

15. A guided projectile, comprising:
a cylindrically-shaped projectile body;
one or more control surfaces on the body;
a dome that is mounted on one end of the body, said dome transmissive of laser energy and IR energy;
a two-axis gimbal;
a dual-mode SAL/IR seeker mounted on the two-axis gimbal inside the body, comprising,
an IR detector configured to detect two-dimensional images of focused incident IR energy to generate at least one IR guidance signal;
a positionally-sensitive SAL detector having a system transfer function that converts the spatial displacement of a spot of focused laser energy to a target bearing to generate at least one SAL guidance signal;
a primary mirror having a common aperture for collecting and focusing laser energy and IR energy propagated through the dome along a common optical path;
a secondary mirror/lens between the dome and primary mirror in the common optical path that creates a central obscuration of the common aperture, said secondary mirror/lens having an aft side facing the primary mirror and a forward side, wherein the aft side is a secondary mirror configured to permit propagation of laser energy there through to the forward side along a first optical path to the SAL detector and to reflect IR energy along a second optical path to the IR detector, said primary and secondary mirrors configured to focus the IR energy to form the two-dimensional images at the detector,
wherein the forward side of the secondary mirror/lens is a secondary lens element, said secondary lens element configured and said SAL detector positioned to form a spot of focused laser energy on the SAL detector; and
a spreader positioned in the first optical path between the secondary mirror and the SAL detector away from the aperture stop at the primary mirror and not in the second optical path between the secondary mirror and the IR detector, said spreader configured to spatially homogenize the laser energy to increase the size of the spot of focused laser energy on the SAL detector to set the system transfer function; and
a flight control system that receives the at least one IR guidance signal and the at least one SAL guidance signal and applies a single calibration offset for all X, Y positions to said SAL guidance signal to generate control signals to manipulate the one or more control surfaces to control the flight of the airborne platform.

16. The guided projectile of claim 15, wherein the secondary lens element is concave, said spreader positioned on the surface of the concave secondary lens.

17. The guided projectile of claim 15, wherein the primary mirror has an outer diameter of at least 3 inches and wherein no optical focusing element is positioned between the spreader and the SAL detector.

* * * * *

UNITED STATES PATENT AND TRADEMARK OFFICE
CERTIFICATE OF CORRECTION

| | | |
|---|---|---|
| PATENT NO. | : 8,164,037 B2 | Page 1 of 1 |
| APPLICATION NO. | : 12/567740 | |
| DATED | : April 24, 2012 | |
| INVENTOR(S) | : David G. Jenkins et al. | |

It is certified that error appears in the above-identified patent and that said Letters Patent is hereby corrected as shown below:

Title page 1, (75) Inventors delete "David D. Jenkins" and insert -- David G. Jenkins --

Signed and Sealed this
Twenty-ninth Day of May, 2012

David J. Kappos
*Director of the United States Patent and Trademark Office*